UNITED STATES PATENT OFFICE.

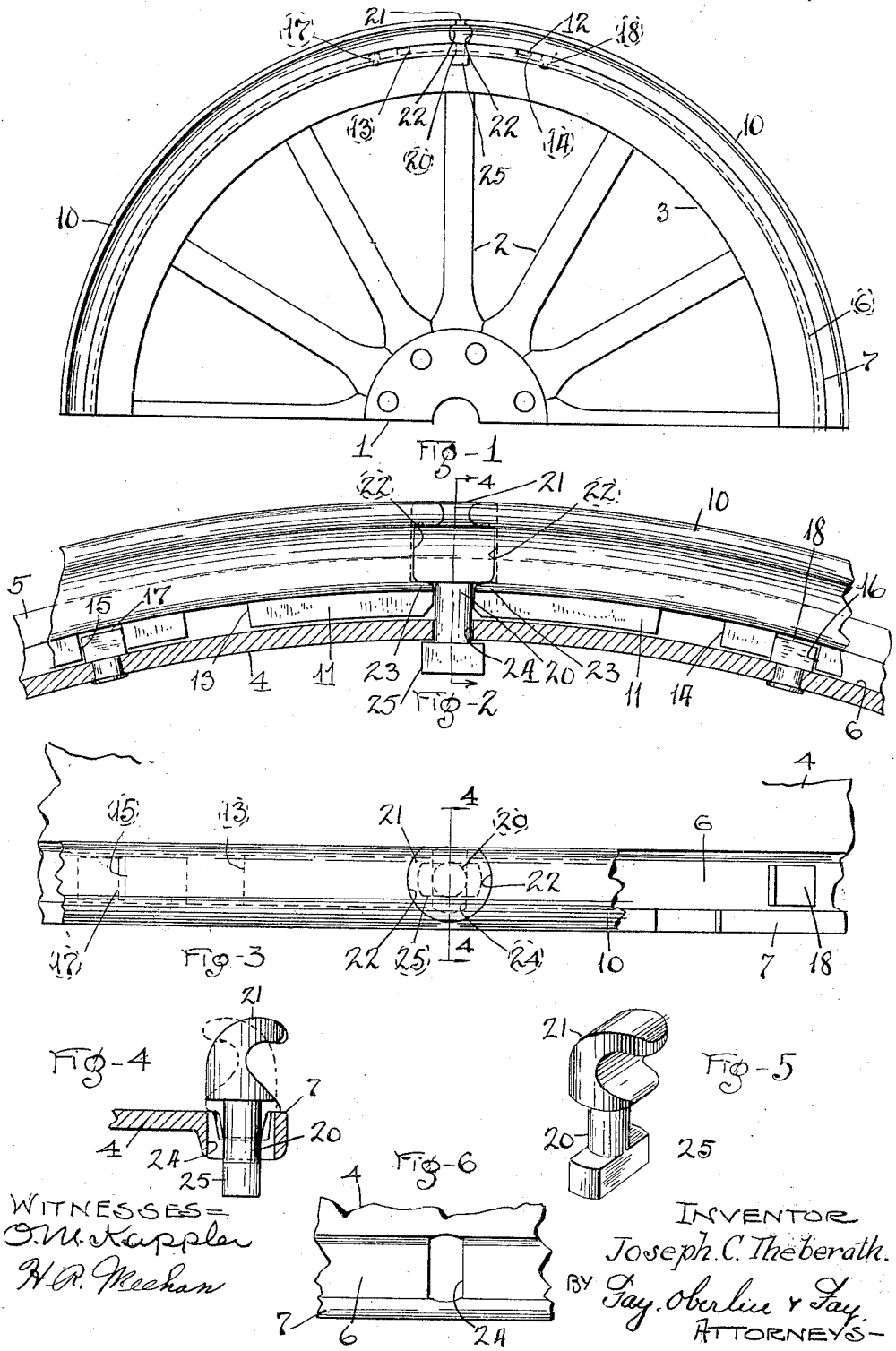

JOSEPH C. THEBERATH, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-WHEEL RIM.

1,346,569.  Specification of Letters Patent.  Patented July 13, 1920.

Application filed September 2, 1916. Serial No. 118,229.

*To all whom it may concern:*

Be it known that I, JOSEPH C. THEBERATH, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements have as their object the simplification of so-called Q. D. or quick detachable rims for pneumatic tires, such as are largely used in connection with automobiles and the like. It will be understood of course that the trade designation "quick detachable" does not refer to the rim proper, but rather to a side-flange on such rim, which is rendered detachable in order to facilitate the placing of a tire on, or its removal from the rim. The present improvements relate more especially to that type of detachable side-flange, or ring, which is transversely split in order to permit it to be taken off and put on the rim, and to the locking device for securing the ends thereof in place when the flange is in operative position.

To the accomplishment of the foregoing and related objects, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1 is a side elevational view of a portion of a wheel body showing a Q. D. rim thereon embodying my present improved construction; Fig. 2 is a side elevational view of the meeting ends of the split side-flange, or ring, with the locking device shown in operative position, the adjacent portion of the rim appearing in section; Fig. 3 is a plan view of the same parts as appear in Fig. 2; Fig. 4 is a transverse section of the locking device and adjacent portion of the rim, taken on the plane indicated by the line 4—4, Figs. 2 and 3, respectively; Fig. 5 is a perspective view of such locking device by itself; and Fig. 6 is a plan view of the portion of the rim with which such locking device directly coöperates.

The construction of the wheel body, which is illustrated in part only in the aforesaid drawing, is a matter of indifference so far as the present invention is concerned, consisting as shown of the usual hub 1, spokes 2 and felly 3. The rim 4, which surrounds such felly is preferably of the so-called "Universal" type, that is it is provided with an abutment 5 around its rear edge (see Fig. 2), adapted to retain in place a continuous side-flange or ring (not shown), which may be reversed to receive and hold either a straight side or clincher tire, as desired. On the other hand, such rim may, of course, be provided with an integral side-flange on such rear edge of either the straight side, or clincher type.

The front edge of the rim 4 is provided with an encircling groove or depression 6, conveniently formed by beading such edge, the outer wall 7 of the groove lying flush or slightly below the outer surface of the rim so as to permit the aforesaid reversible side flange (when one is used), to be slipped over it as occasion may require.

The part of the structure of present interest is the outer flange 10 which, as previously indicated, is transversely split at one point in its circumference, in order that it may be detachably secured to the rim, such flange having its inner edge 11 formed to seat in the aforesaid groove or depression 6, but being sufficiently resilient to permit its ends to be separated and the ring thus expanded until it can be removed from such groove. One end (the right as shown in Fig. 1), is most conveniently pried out first, the wall of the groove being cut away at 12 to permit the insertion of a screw-driver or like implement, and the inner edge 11 of the ring, which seats in the groove, being cut away at points 13 and 14, spaced a corresponding distance from the respective ends, with the same object in view. This edge is also cut away at other points 15 and 16, preferably located a trifle farther from the ends of the ring, than the notches 13 and 14 referred to, such cutaway portions or notches 15 and 16 being adapted to interchangeably engage with lugs 17 and 18 riveted or otherwise formed in the bottom of the groove.

From the foregoing described construction, it follows that when the ring or flange 10 is seated in the groove 6 with its ends in juxtaposition, not only is such flange held against circumferential displacement about the rim, but if such ends be secured against displacement radially outwardly, the flange as a whole will be effectually locked to the rim.

To thus secure such flange ends then to the rim, a locking member of the form best shown in Figs. 2, 4 and 5 is provided, such member consisting of a short cylindrical stem or shaft 20, with a rectangularly shouldered head 21 on its upper end of circular outline in plan view (see Fig. 3), and of cross-sectional form the same as that of the side flange or ring itself, (see Fig. 4). It will accordingly be seen that in one position, as shown in full lines in Fig. 4, the head 21 will aline perfectly with the flange 10, when the latter is disposed to receive a straight side tire, while such head will similarly aline, when turned through an angle of 180 degrees into the position shown in dotted outline in the same figure, with the flange when positioned to receive a clencher tire.

The head 21 is of less depth radially than the flange or ring, and the meeting ends of the latter are cut away to a corresponding depth so as to leave complementary semicircular recesses 22, 22 into which such head snugly fits, with its under side or shoulder bearing on the projecting portions 23, 23 of the ends (Fig. 2). There is just enough space left between the latter for the spindle 20 to pass, the spindle being of a length sufficient to extend through a transverse slot 24, of the form shown in Fig. 6, in the bottom of the groove 6, the lower end of the spindle being provided with a T-enlargement 25 of such form and dimensions as to permit it to pass readily through such slot when properly alined therewith. Such head, however, will lie at right angles to the slot when the upper locking head proper is in either of the operative positions illustrated in Fig. 4.

With the upper head 21 of the locking member in either of such operative positions, it will be obvious that the adjacent bead of the tire shoe, which bears against the side ring, will prevent the locking member from being turned in either direction, so that such member will be securely held in place by reason of the fact that the T-head 25 on its lower side lies crosswise of the slot 24. When the tire, however, is in deflated condition, the bead of the tire casing may be readily pushed inwardly an amount sufficient to permit the locking member to be turned through an angle of 90 degrees, so as to bring such T-head into register with such slot, whereupon the locking member as a whole may be readily lifted from between the ring-ends and such ring thus left free to be pried out of the groove. When it is desired to replace the ring the operation is simply the reverse of that just described, and so need not be described in detail.

The simplicity of the foregoing construction of Q. D. rim, both from a manufacturing and operative standpoint, should be obvious. The locking member proper can be made as a drop forging, while the recesses in the meeting ends of the ring can be simultaneously formed, by a single drilling operation, in both such ends, and in other particulars the cost of construction is markedly reduced, compared with any construction at present on the market. From the user's standpoint, it is sufficient to note that no special tool is required, a pincers or wrench serving to turn and remove the locking member, providing it fits too tightly to permit this to be done with the fingers, while no handle, latch or nut is required to secure such member in operative position, the tire shoe itself serving this purpose.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:—

1. The combination with a wheel rim; of a split side-flange removably mounted on said rim; and means for locking the ends of said flange to said rim, comprising a member formed to interlock with the juxtaposed ends of said flange and adapted, upon rotation, to interlock with said rim.

2. The combination with a wheel rim; of a split side-flange removably mounted on said rim; and means for locking the ends of the said flange to said rim, comprising an independently separable member adapted in one position to interengage with both rim and the juxtaposed ends of said flange and in another position to engage with said flange-ends only, said member being normally retained in such first-named position by the tire on said rim.

3. The combination with a wheel rim formed with an elongated slot near one edge; a split side-flange removably mounted on said rim about such edge, the juxtaposed ends of said flange being recessed; and a double-headed locking member adapted to engage such recessed ends with one head, the other head of said member being adapted in one position of the latter to pass through the slot in said rim, and in another position to interengage with said rim.

4. The combination with a wheel rim formed with an elongated slot near one edge; a split side-flange removably mounted on said rim about such edge, the juxtaposed ends of said flange being cut-away so as to leave a complementary circular recess; and a locking member having a head of circular cross-section at one end adapted to rotatably seat in such recesses and having a T-head on its other end adapted in one rotative position of said member to pass through the slot in said rim, and in another position to engage the under side of said rim.

5. The combination with a wheel rim formed with an elongated slot near one edge; a split side-flange removably mounted on said rim about such edge, the juxtaposed ends of said flange being recessed; and a double headed locking member adapted to engage such recessed ends with one head, the other head of said member being adapted in one position of the latter to pass through the slot in said rim, and in another position to interengage with said rim, such first named head having a vertical section substantially corresponding with the cross-sectional form of said flange, whereby a tire on said rim is adapted to retain said member in its operative position.

6. The combination with a wheel rim formed with an elongated slot near one edge; a split side-flange removably mounted on said rim about such edge, the juxtaposed ends of said flange being cut-away so as to leave complementary circular recesses; and a locking member having a head of circular cross-section at one end adapted to rotatably seat in such recesses and having a T-head on its other end adapted in one rotative position of said member to pass through the slot in said rim, and in another position to engage the under side of said rim, such first named head having a vertical section substantially corresponding with the cross-sectional form of said flange, whereby a tire on said rim is adapted to retain said member in its operative position.

Signed by me, this 24 day of August, 1916.

JOSEPH C. THEBERATH.

Attested by—
C. W. GRESSLE,
OTTO H. JOBSKI.